US012548897B2

(12) United States Patent
So et al.

(10) Patent No.: US 12,548,897 B2
(45) Date of Patent: Feb. 10, 2026

(54) MILLIMETER-WAVE PHASE SHIFTER DRIVING APPARATUS FOR PREVENTING DISTORTION

(71) Applicant: ACE TECHNOLOGIES CORPORATION, Incheon (KR)

(72) Inventors: Hyun Hwa So, Incheon (KR); In Youb Lee, Incheon (KR); Seong Ryong Gil, Seoul (KR); Seung Hyun Kim, Incheon (KR); Hyo Seok Ko, Incheon (KR)

(73) Assignee: ACE TECHNOLOGIES CORPORATION, Incheon (KR)

( * ) Notice: Subject to any disclaimer, the term of this patent is extended or adjusted under 35 U.S.C. 154(b) by 48 days.

(21) Appl. No.: 18/661,186

(22) Filed: May 10, 2024

(65) Prior Publication Data

US 2024/0297435 A1 Sep. 5, 2024

Related U.S. Application Data

(63) Continuation of application No. PCT/KR2022/017742, filed on Nov. 11, 2022.

(30) Foreign Application Priority Data

Nov. 11, 2021 (KR) ........................ 20-2021-0003437

(51) Int. Cl.
*H01Q 3/32* (2006.01)
*H01P 1/18* (2006.01)
*H01Q 3/16* (2006.01)

(52) U.S. Cl.
CPC ................ *H01Q 3/32* (2013.01); *H01P 1/18* (2013.01); *H01Q 3/16* (2013.01)

(58) Field of Classification Search
CPC .. H01Q 3/16; H01Q 3/32; H01Q 3/36; H02K 7/06; H01P 1/18; H01P 1/184
See application file for complete search history.

(56) References Cited

U.S. PATENT DOCUMENTS 10,199,702 B2 * 2/2019 Liao ..................... H01Q 9/0485
10,411,346 B2 * 9/2019 Xu ........................... H01Q 3/32
(Continued)

FOREIGN PATENT DOCUMENTS

CN 111129772 A * 5/2020 ............... H01Q 3/32
CN 112436249 A 3/2021
(Continued)

OTHER PUBLICATIONS

International Search Report issued from PCT International Application No. PCT/KR2022/017742 issued on Apr. 10, 2023.
(Continued)

*Primary Examiner* — Adam D Rogers

(57) ABSTRACT

A phase shifter driving apparatus comprises: a motor; a movable member moved by the motor; a sliding member disposed at a predetermined distance from a reflector and including at least one sliding bar coupled with the movable member to slide in a horizontal direction; and a guide member fixed to the reflector and guiding the movement of the at least one sliding bar. The guide member comprises: a main body, a first supporter extending in a downward direction from a first side of the main body and contacting the reflector, a second supporter extending in a downward direction from a second side of the main body and contacting the reflector, and an insertion portion that protrudes upward from the main body and forms a rectangular shaped insertion hole for inserting the sliding member into the protruding area.

16 Claims, 13 Drawing Sheets

(56) References Cited

U.S. PATENT DOCUMENTS

| | | | | | |
|---|---|---|---|---|---|
| 11,264,685 | B2 * | 3/2022 | Ding | H01P 1/184 | |
| 11,652,263 | B2 * | 5/2023 | Kang | H01P 1/184 | 333/161 |
| 12,388,175 | B2 * | 8/2025 | Yu | H01P 1/18 | |
| 2021/0242551 | A1 | 8/2021 | Ding | | |
| 2023/0031553 | A1 * | 2/2023 | Guo | H01Q 3/267 | |

FOREIGN PATENT DOCUMENTS

| | | | | | |
|---|---|---|---|---|---|
| CN | 113629399 | A | * | 11/2021 | H01Q 3/32 |
| KR | 10-2011-0100447 | A | | 9/2011 | |
| KR | 10-1567882 | B1 | | 11/2015 | |
| KR | 10-1786960 | B1 | | 10/2017 | |
| KR | 101831432 | B1 | * | 2/2018 | H01Q 1/246 |
| KR | 20190103777 | A | * | 9/2019 | H01Q 3/36 |
| KR | 10-2020-0006880 | A | | 1/2020 | |
| KR | 102512924 | B1 | * | 3/2023 | H01Q 1/526 |
| KR | 20230056178 | A | * | 4/2023 | H01Q 1/1207 |
| WO | WO-2018072414 | A1 | * | 4/2018 | H01Q 3/36 |
| WO | WO-2022160094 | A1 | * | 8/2022 | H01Q 19/10 |
| WO | WO-2025025753 | A1 | * | 2/2025 | H01Q 3/36 |

OTHER PUBLICATIONS

Written Opinion of the International Searching Authoriity of PCT/KR2022/017742 issued on Apr. 10, 2023.

* cited by examiner

MILLIMETER-WAVE PHASE SHIFTER DRIVING APPARATUS FOR PREVENTING DISTORTION

CROSS-REFERENCE TO RELATED APPLICATIONS

This application is a bypass continuation of PCT International Application No. PCT/KR2022/017742, which was filed on Nov. 11, 2022, and which claims priority from Korean Utility Model Application No. 20-2021-0003437 filed in the Korean Intellectual Property Office on Nov. 11, 2021. The entire contents of the aforementioned patent applications are incorporated herein by reference.

BACKGROUND

1. Technical Field

The present disclosure relates to a phase shifter driving apparatus, and more particularly, to a phase shifter driving apparatus for preventing distortion.

2. Description of the Related Art

Base station antennas used recently are MIMO array antennas in which multiple radiators are arranged. The MIMO array antenna changes the phase of the signal fed to the radiators to form a beam in a specific direction.

These array antennas use a phase shifter to adjust the phase of the signal fed to each radiator. The phase of the fed signal is related to the length of the transmission line, and the phase shifter changes the phase of the fed signal by changing the length of the transmission line section for feeding.

A phase shifter driving apparatus is provided to drive the phase shifter, and the phase shifter driving apparatus provides power for the phase shifter to change the length of the feeding section.

Power for driving the phase shifter is mainly provided from a motor, and the rotational movement of the motor is converted to drive the phase shifter.

Meanwhile, in recent years, the millimeter wave band of 20 GHz or higher has begun to be used for communication. The millimeter wave band, unlike the previously used low-frequency band, has the problem of large signal attenuation depending on the transmission distance and very poor transmission characteristics for obstacles.

In particular, since the millimeter wave band is an ultra-high frequency band, the size of RF equipment such as antennas, phase shifter driving apparatus, connectors, etc. is much smaller than that of the existing low-frequency band, requiring precise design and manufacturing.

Furthermore, RF equipment in the millimeter wave band experiences serious deviations in characteristics even with very small shaking or distortion. RF equipment in the millimeter wave band with a short wavelength will have a serious impact on its characteristics and performance even if it is moved a very small distance by shaking or distortion.

Due to this problem, if the existing phase shifter driving apparatus is used as is in the millimeter wave band, characteristic deterioration occurs due to distortion and shaking, and a phase shifter driving apparatus to solve these problems is required.

SUMMARY

An object of the present disclosure is to propose a millimeter wave band phase shifter driving apparatus that can prevent characteristic deterioration that may occur due to shaking and distortion.

Another object of the present disclosure is to propose a millimeter wave band phase shifter driving apparatus that prevents the components constituting the phase shifter driving apparatus from separating and can be simply assembled.

According to one aspect of the present disclosure to achieve the above-mentioned objects, a phase shifter driving apparatus is provided, the apparatus comprising: a motor; a movable member moved by the motor; a sliding member disposed at a predetermined distance from a reflector and including at least one sliding bar coupled with the movable member to slide in a horizontal direction; and a guide member fixed to the reflector and guiding the movement of the at least one sliding bar, wherein the guide member comprises: a main body, a first supporter extending in a downward direction from a first side of the main body and contacting the reflector, a second supporter extending in a downward direction from a second side of the main body and contacting the reflector, and an insertion portion that protrudes upward from the main body and forms a '□'-shaped insertion hole for inserting the sliding member into the protruding area, and wherein the heights of the first supporter and the second supporter are determined based on the separation distance between the reflector and the sliding bar.

An open hole is formed in the lower part of the '□'-shaped insertion hole.

The width of the central portion of the at least one sliding bar is relatively larger than the width of the terminal portion of the at least one sliding bar, and the width of the terminal portion of the sliding member is set to be smaller than the width of the open hole.

The terminal portion of the at least one sliding bar is inserted into the '□'-shaped insertion hole through the open hole of the guide member, the guide member is moved to the central portion of the at least one sliding bar, and then the guide member is fixed to the reflector, and the width of the '□'-shaped insertion hole corresponds to the width of the at least one sliding bar.

At least one fixing hook extending in a downward direction is formed on the main body, and the fixing hook is inserted and fixed into an opening of a post coupled to the reflector.

A locking protrusion is formed in the opening of the post, and the locking protrusion acts as a stopper after the fixing hook is inserted into the opening.

According to another aspect of the present disclosure, a phase shifter driving apparatus is provided, the apparatus comprising: a motor; a movable member moved by the motor; a sliding member disposed at a predetermined distance from a reflector and including at least one sliding bar coupled with the movable member to slide in a horizontal direction; and a guide member fixed to the reflector and guiding the movement of the at least one sliding bar, wherein the guide member comprises: a main body, a first supporter extending in a downward direction from a first side of the main body and contacting the reflector, a second supporter extending in a downward direction from a second side of the main body and contacting the reflector, and an insertion portion that protrudes upward from the main body and forms a '□'-shaped insertion hole for inserting the sliding member into the protruding area, and wherein a width of a central portion of the at least one sliding bar is relatively large compared to a width of a terminal portion of the at least one sliding bar.

According to still another aspect of the present disclosure, a phase shifter driving apparatus is provided, the apparatus comprising: a sliding member disposed at a predetermined distance from a reflector and including a plurality of sliding bars sliding in a horizontal direction; and a guide member fixed to the reflector and guiding the movement of the at least one sliding bar, wherein the guide member comprises: a main body coupled to the reflector, and a 'ㄱ'-shaped protrusion protruding from the main body, and wherein the 'ㄱ'-shaped protrusion is divided into a horizontal part and a vertical part, and the sliding member is inserted into the insertion space between the horizontal part and the main body.

The phase shifter driving apparatus according to the present disclosure has the advantage of preventing characteristic deterioration that may occur due to shaking and distortion in the millimeter wave band, preventing separation of parts constituting the phase shifter and enabling simple assembly.

DETAILED DESCRIPTION OF THE INVENTION

Figure 1:
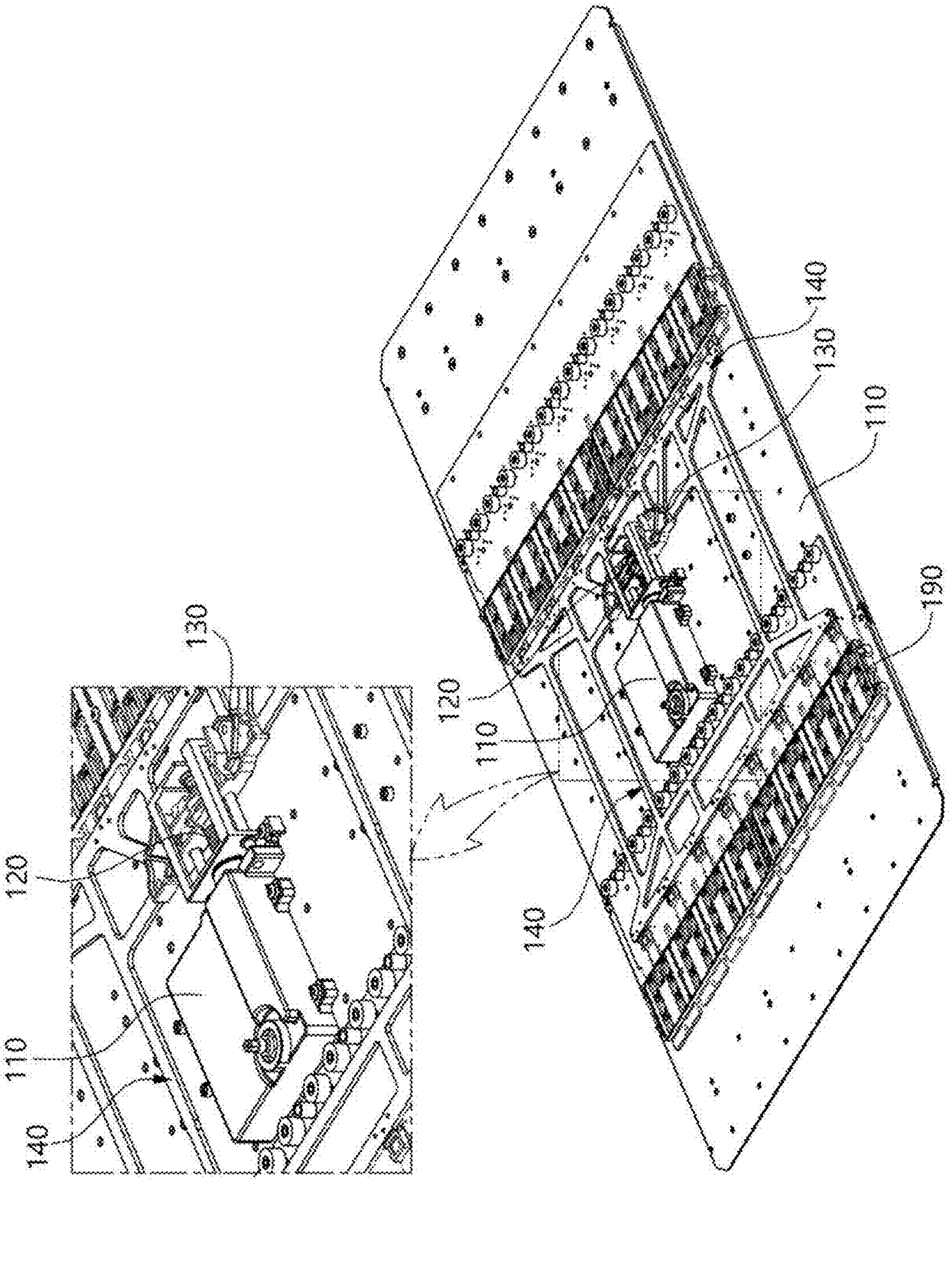
FIG. 1 is a diagram showing a structure of a conventional phase shifter driving apparatus.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

FIG. 1 is a diagram showing a structure of a conventional phase shifter driving apparatus.

Referring to FIG. 1, the phase shifter driving apparatus according to an embodiment of the present disclosure includes a reflector 100, a motor 110, a drive shaft 120, a movable member 130, and a sliding member 140.

The motor 110 provides power for rotation to the drive shaft 120. The motor 110 receives power from an external source or provides power for rotation to the drive shaft 120 using a battery as an internal power source.

A first terminal of the drive shaft 120 is coupled to the motor 110 and receives power from the motor 110. The drive shaft 120 rotates by the power of the motor 110. Depending on the rotation direction of the motor, the drive shaft 120 rotates clockwise or counterclockwise.

A thread is formed on the drive shaft 120, and the movable member 130 is coupled to the outer peripheral surface of the drive shaft 120. In the movable member 130, a thread is also formed on the inner peripheral surface of the hole for coupling to the drive shaft 120.

When the drive shaft 120 rotates, the movable member 130 moves horizontally due to the coupling of the thread on the outer peripheral surface of the drive shaft and the thread on the inner peripheral surface of the hole of the movable member 130. The horizontal movement direction of the movable member is determined by the rotation direction of the drive shaft 120. For example, when the drive shaft 120 rotates clockwise, the movable member 130 moves horizontally to the right, and when the drive shaft 120 rotates counterclockwise, the movable member 130 moves horizontally to the left.

The movable member 130 is coupled to the sliding member 140, and the sliding member 140 moves corresponding to the movement of the movable member. The sliding member 140 has a plurality of sliding bars 145, and a length of the feeding section changes as the plurality of sliding bars 145 move horizontally.

The sliding member 140 is coupled with the phase shifter 190 to move the phase shifter 190, and the length of the feeding section is changed by the movement of the phase shifter 190.

As described in the Related Art, the phase shifter and phase shifter driving apparatus for millimeter waves have a very small size and can easily be shaken or distorted even by a small impact.

Such shaking and distortion affect the sliding operation of the sliding member 140, and as a result, the intended movement of the phase shifter may not be achieved. In particular, the sliding member 140 may not move horizontally to the left or right as intended but may move in another direction, which inevitably deteriorates the performance of the antenna.

In order to solve this problem, the present disclosure proposes a structure that couples a guide member to the sliding bar 145 of the sliding member 140, and proposes a structure of the guide member that can move as intended by the operator even if the sliding bar 145 is shaken or distorted.

Figure 2:
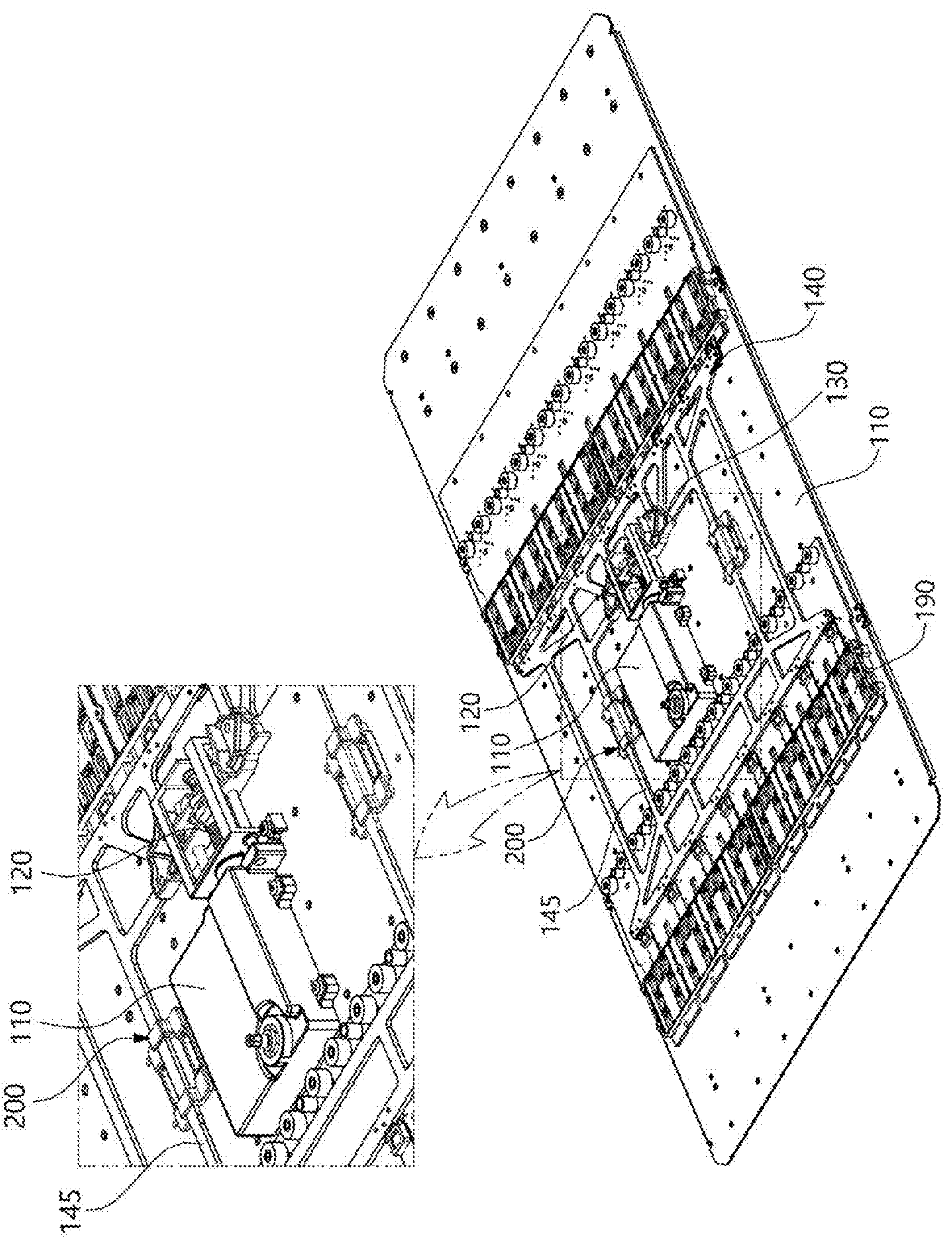
FIG. 2 is a diagram showing a structure of a phase shifter driving apparatus according to an embodiment of the present disclosure.

FIG. 2 is a diagram showing a structure of a phase shifter driving apparatus according to an embodiment of the present disclosure.

Referring to FIG. 2, the phase shifter driving apparatus according to an embodiment of the present disclosure has a guide member 200 additionally coupled to the sliding bar 145 compared to the conventional phase shifter driving apparatus.

FIG. 2 shows an example in which two guide members 200 are coupled to two sliding bars 145, but it will be obvious to those skilled in the art that the number of guide members can be appropriately changed as needed.

As shown in FIG. 2, the guide member 200 according to an embodiment of the present disclosure is coupled to the sliding bar 145 and fixed on the reflector 100.

Figure 3:
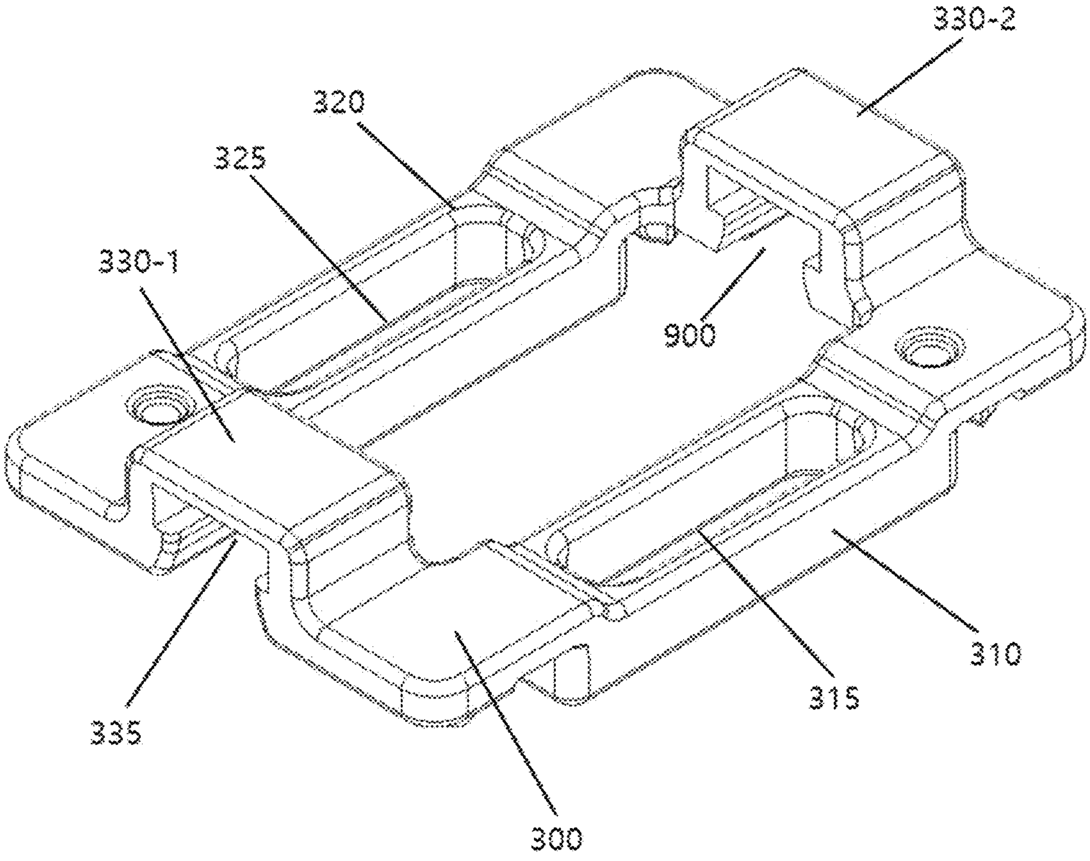
FIG. 3 is a perspective view of a guide member according to an embodiment of the present disclosure as seen from the upper surface.
Figure 4:
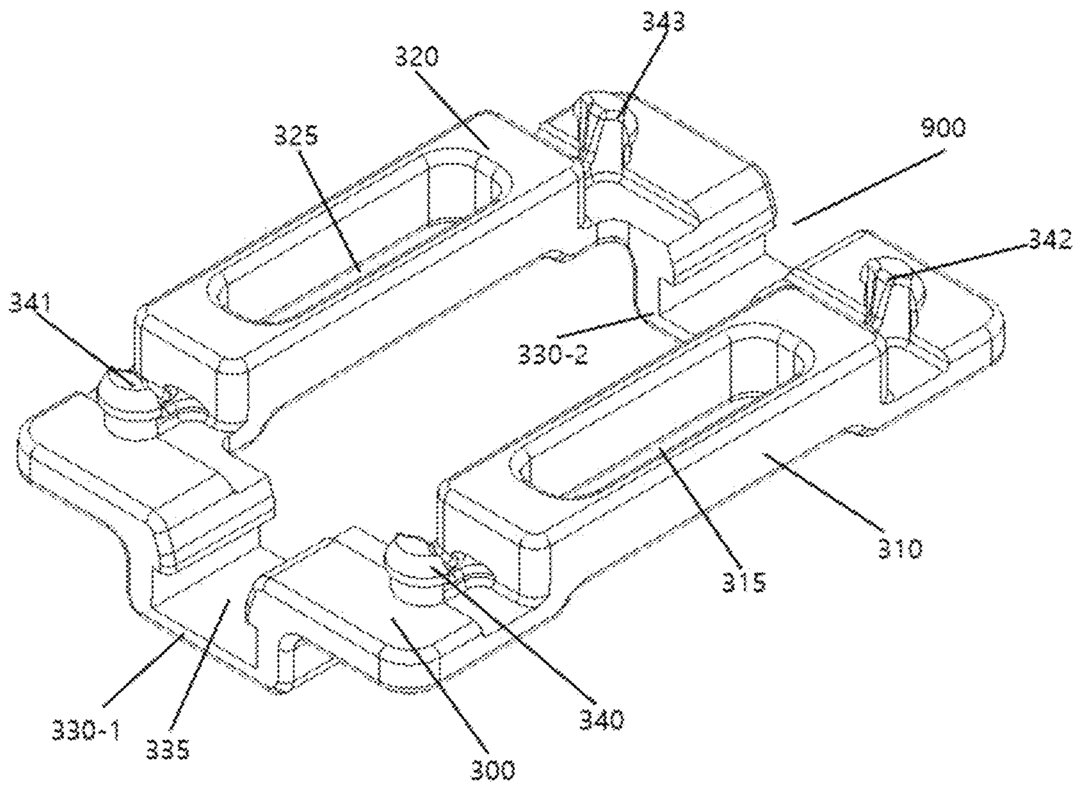
FIG. 4 is a perspective view of a guide member according to an embodiment of the present disclosure as seen from the bottom surface.

FIG. 3 is a perspective view of a guide member according to an embodiment of the present disclosure as seen from the upper surface, and FIG. 4 is a perspective view of a guide member according to an embodiment of the present disclosure as seen from the bottom surface.

Referring to FIGS. 3 and 4, the guide member 200 according to an embodiment of the present disclosure includes a main body 300, a first supporter 310, a second supporter 320, an insertion portions 330-1 and 330-2, and a plurality of fixing hooks 340, 341, 342 and 343.

The first supporter 310 and the second supporter 320 are formed in the downward direction of the main body 300. The first supporter 310 and the second supporter 320 contact the reflector 100 of the phase shifter driving apparatus so that the insertion portions 330-1 and 330-2 of the guide member 200 have an appropriate height to guide the movement of the sliding bar 145. The height of the first supporter 310 and the second supporter 320 is determined based on the distance between the sliding bar 145 and the reflector 100.

Holes 315 and 325 may be formed in the first supporter 310 and the second supporter 320, and the holes 315 and 325 may be formed to ensure the structural stability of the guide member 200 and reduce the weight.

The insertion portions 330-1 and 330-2 are formed to protrude upward from the main body 300. A '⬚'-shaped insertion hole 335 is formed in the protruding area forming the insertion portions 330-1 and 330-2, and the sliding bar 145 is inserted into the '⬚'-shaped insertion hole 335.

The insertion hole 335 formed in the insertion portions 330-1 and 330-2 is blocked on the left, right, and top, and an open hole 900 is formed at the bottom of the insertion hole 335, so that a portion of the bottom of the insertion hole 335 has an open structure. The reason for forming the open hole 900 at the bottom of the insertion hole 335 will be described with reference to separate drawings.

Since the sliding bar 145 moves while inserted into the insertion portions 330-1 and 330-2, its movement in unintended directions is restricted, thereby preventing malfunction due to shaking or distortion.

Meanwhile, a plurality of fixing hooks 340, 341, 342 and 343 are formed on the bottom of the main body. The plurality of fixing hooks 340, 341, 342 and 343 are components for fixing the guide member 200 on the reflector 100.

According to one embodiment of the present disclosure, after fixing four posts on the reflector 100, the guide member 200 can be fixed on the reflector 100 by inserting fixing hooks 340, 341, 342 and 343 into the posts. A coupling structure to which fixing hooks 340, 341, 342 and 343 can be coupled is formed on the posts.

According to another embodiment of the present disclosure, the fixing hooks 340, 341, 342 and 343 may be directly fixed on the reflector 100. However, in order for the fixing hooks 340, 341, 342 and 343 to be directly coupled to the reflector 100, a coupling structure must be formed in the reflector 100.

Figure 5:
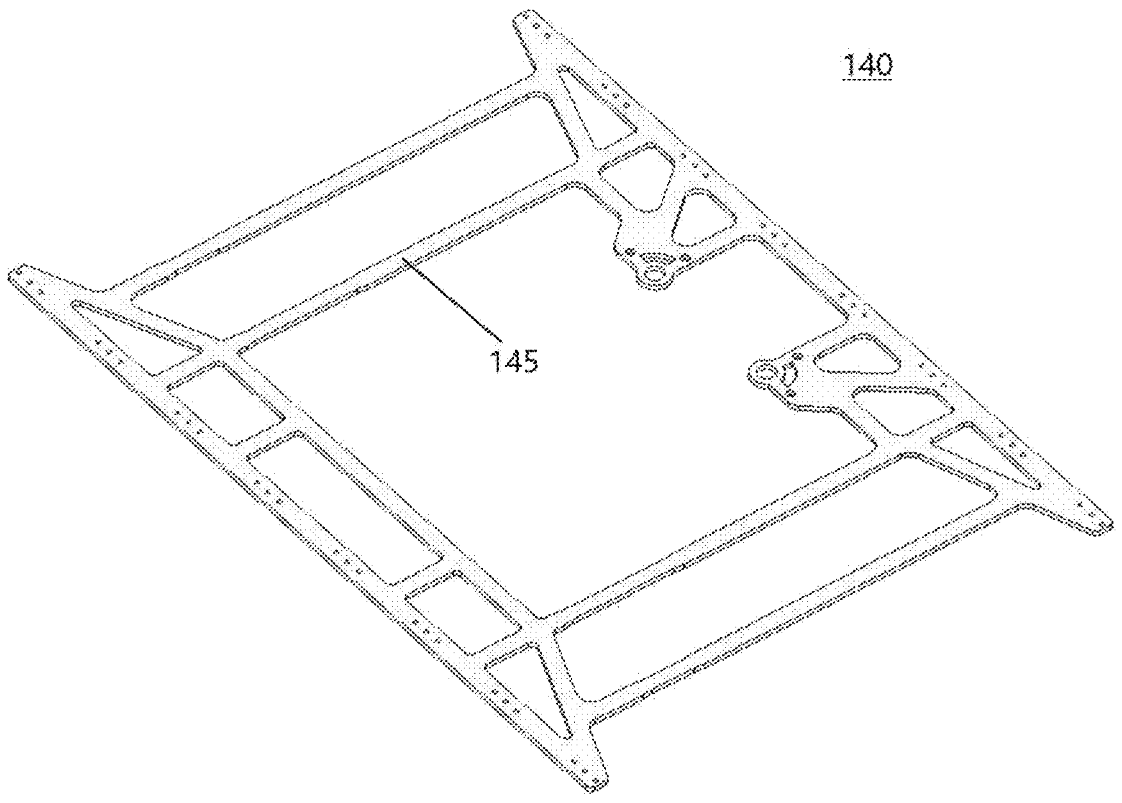
FIG. 5 is a diagram showing a structure of a sliding member to which a guide member is coupled according to an embodiment of the present disclosure.

FIG. 5 is a diagram showing a structure of a sliding member to which a guide member is coupled according to an embodiment of the present disclosure.

Referring to FIG. 5, the sliding member 140 to which the guide member according to an embodiment of the present disclosure is coupled includes a plurality of sliding bars 145, and the sliding member 140 is coupled with the movable member 130 and moves.

Figure 6:
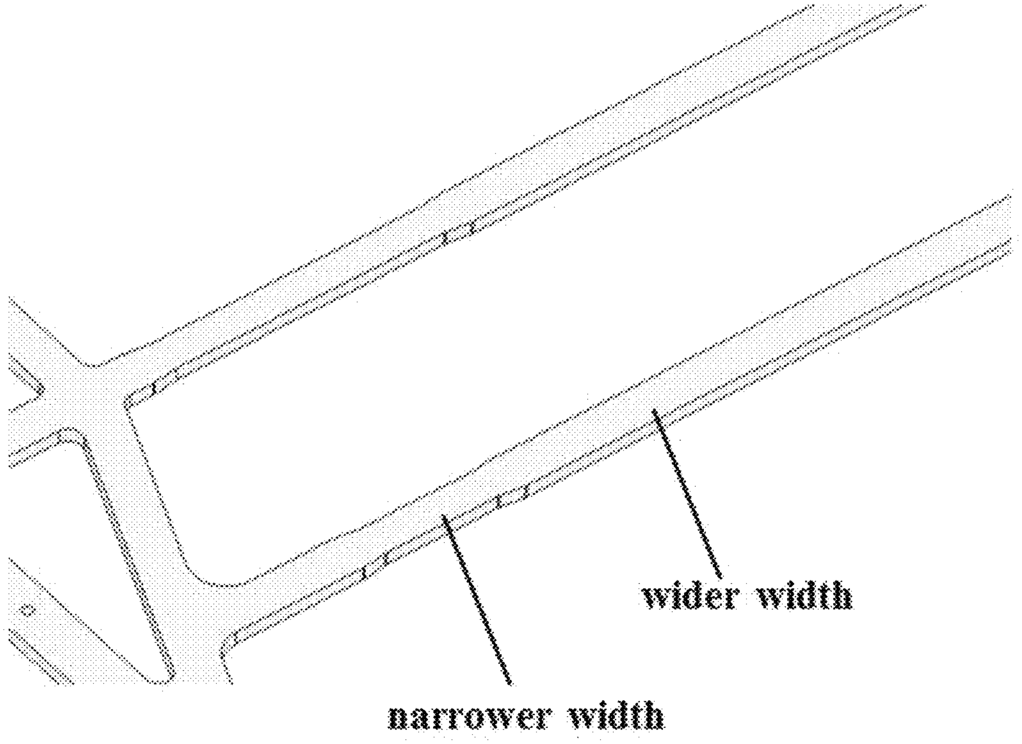
FIG. 6 is an enlarged view of a portion of a sliding bar in a sliding member to which a guide member is coupled according to an embodiment of the present disclosure.

FIG. 6 is an enlarged view of a portion of a sliding bar in a sliding member to which a guide member is coupled according to an embodiment of the present disclosure.

Referring to FIG. 6, the sliding bar 145 of the phase shifter driving apparatus according to an embodiment of the present disclosure has a relatively large width at the central portion and a relatively small width at the terminal portion. This change in the width of the sliding bar 145 is to stably couple the guide member to the sliding bar 145.

As shown in FIG. 6, since the terminal of the sliding bar 145 is coupled to another part of the sliding member 140, it is not easy to couple the guide member through the terminal of the sliding bar 145. The present disclosure allows the guide member 200 to be stably inserted into the sliding bar 145 whose terminal is coupled to another part by changing the width of the sliding bar 145.

Figure 7A:
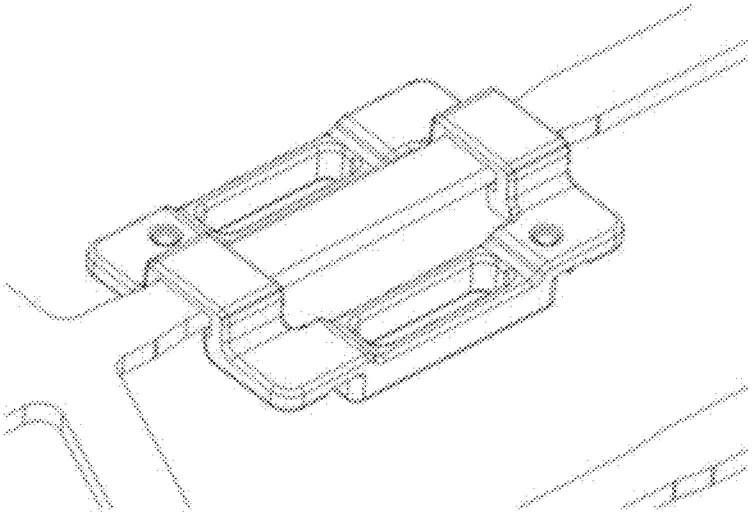
FIGS. 7A and 7B are a diagram showing a method of coupling a guide member to a sliding bar of a sliding member according to an embodiment of the present disclosure.
Figure 7B:
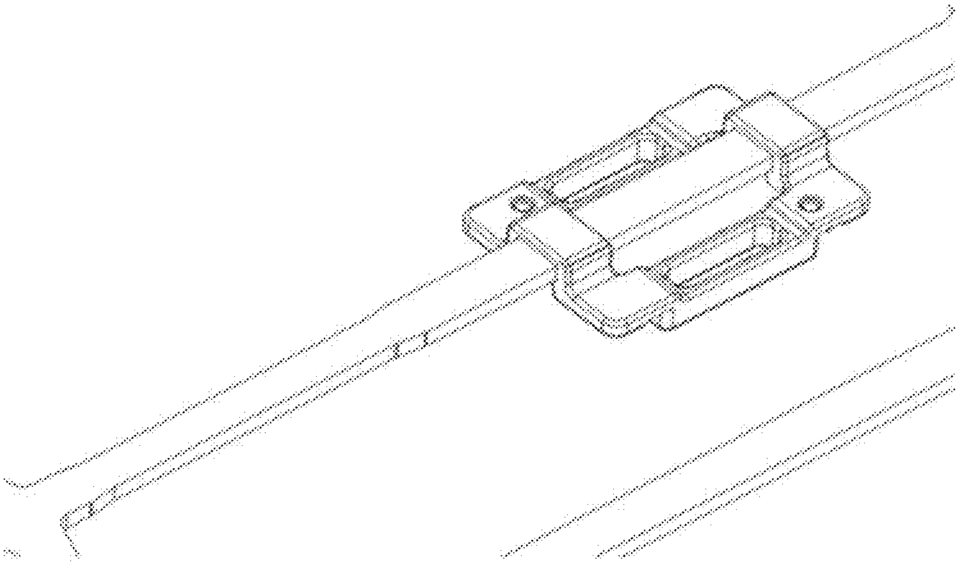

FIGS. 7A and 7B are a diagram showing a method of coupling a guide member to a sliding bar of a sliding member according to an embodiment of the present disclosure.

As described above, an open hole 900 is formed in the lower part of the '⬚'-shaped insertion hole 335 of the insertion portions 330-1 and 330-2 of the guide member 200 in FIG. 4.

The width of the open hole is set to be smaller than the width of the central portion of the sliding bar 145, and larger than the width of the terminal portion of the sliding bar 145. Accordingly, it is possible to couple the guide member 200 to the terminal portion of the sliding bar 145 through the open hole. The terminal portion of the sliding bar 145 is inserted into the insertion portions 330-1 and 330-2 through the open hole.

FIG. 7A shows a state in which the guide member 200 is coupled to the terminal portion of the sliding bar 145.

As shown in FIG. 7B, with the guide member 200 coupled to the terminal portion of the sliding bar 145, the guide member 200 is slid to the central portion of the sliding bar 145.

FIG. 7B shows a state in which the guide member 200 coupled to the terminal portion of the sliding bar 145 is moved to the central portion of the sliding bar 145.

The width of the insertion hole 335 formed by the insertion portions 330-1 and 330-2 corresponds to the width of the central portion of the sliding bar 145. Accordingly, when the guide member 200 moves to the central portion of the sliding bar 145, the insertion hole 335 is filled with the sliding bar 145, thereby providing stable guidance and preventing distortion of the sliding bar.

Figure 8:
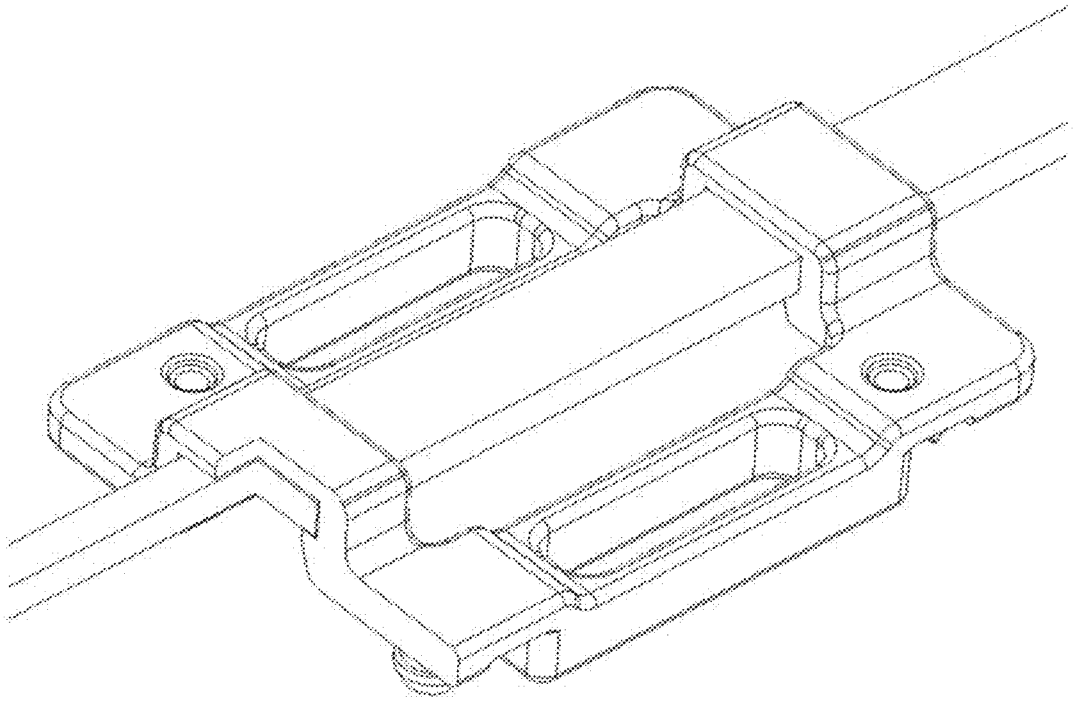
FIG. 8 is a diagram showing a state in which a guide member and a sliding bar are coupled in a phase shifter driving apparatus according to an embodiment of the present disclosure.
Figure 9:
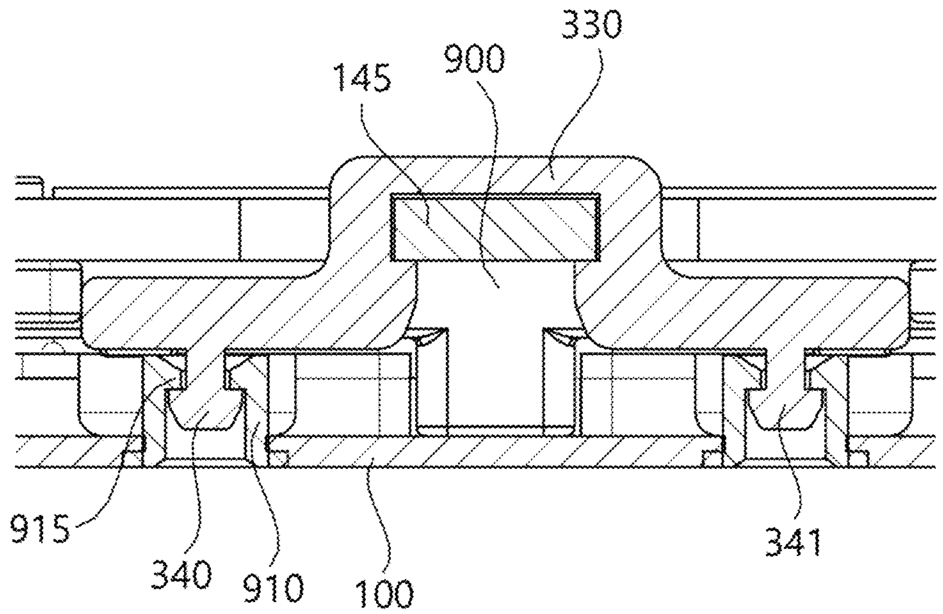
FIG. 9 is a cross-sectional view showing a guide member and a sliding member in a coupled state in a phase shifter driving apparatus according to an embodiment of the present disclosure.

FIG. 8 is a diagram showing a state in which a guide member and a sliding bar are coupled in a phase shifter driving apparatus according to an embodiment of the present disclosure, and FIG. 9 is a cross-sectional view showing a guide member and a sliding member in a coupled state in a phase shifter driving apparatus according to an embodiment of the present disclosure.

Referring to FIGS. 8 and 9, the sliding bar 145 is inserted into the insertion portion 330-1, and the width of the central portion of the sliding bar 145 corresponds to the width of the insertion hole, so the sliding bar 145 is restricted from moving in the left and right directions. In addition, since the upper part of the insertion hole is blocked, upward movement of the sliding bar 145 is also restricted. In addition, since the width of the central portion of the sliding bar 145 is larger than the width of the open hole 900, movement in the downward direction is also restricted.

Posts 910 having openings are coupled to the reflector 100, and the fixing hooks 340 and 341 are inserted into the openings of the posts 910. Locking protrusions 915 are formed in the openings of the posts 910, and the fixing hooks 340 and 341 are inserted into the openings of the posts 910 in an interference fit manner and are then fixed by the locking protrusions 915. Since the head portions of the fixing hooks 340 and 341 have a trapezoidal shape with an upper width smaller than that of the lower part, after being inserted into the openings of the posts 910, the locking protrusions 915 act as stoppers for the fixing hooks 340 and 341.

Figure 10:
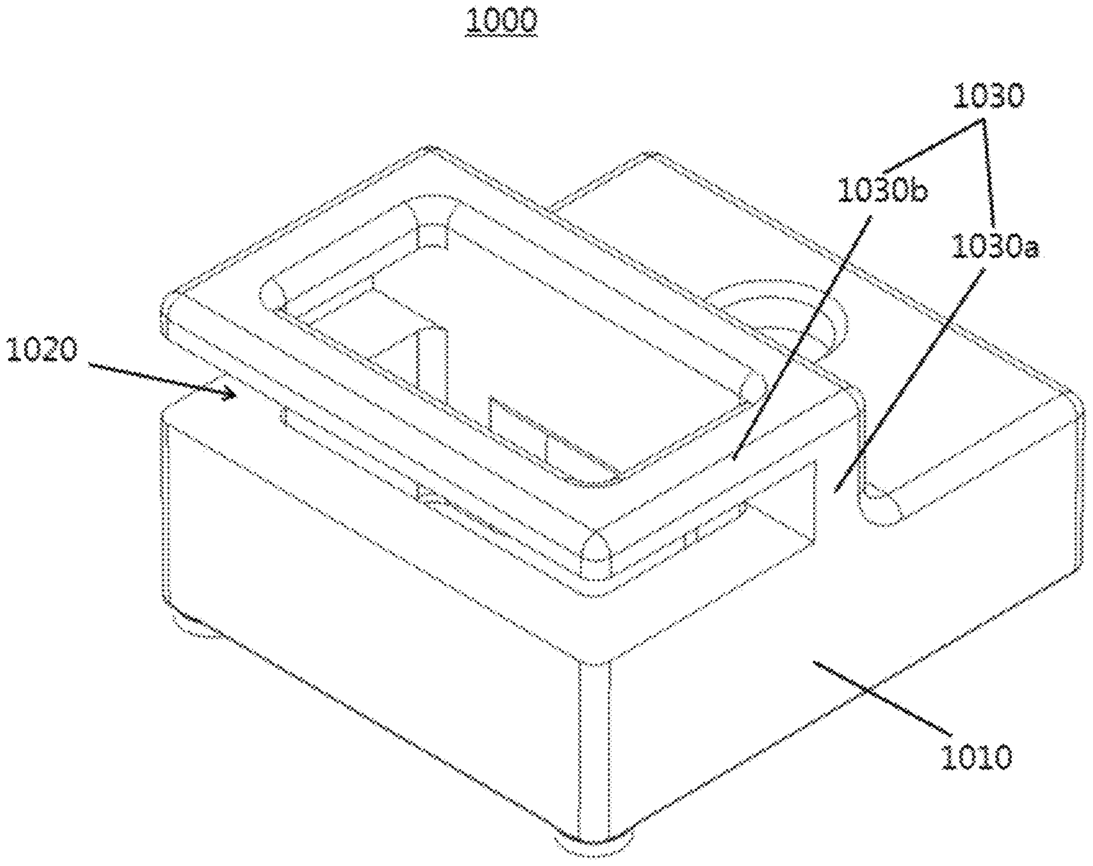
FIG. 10 is a perspective view of a guide member according to another embodiment of the present disclosure as seen from the upper surface.
Figure 11:
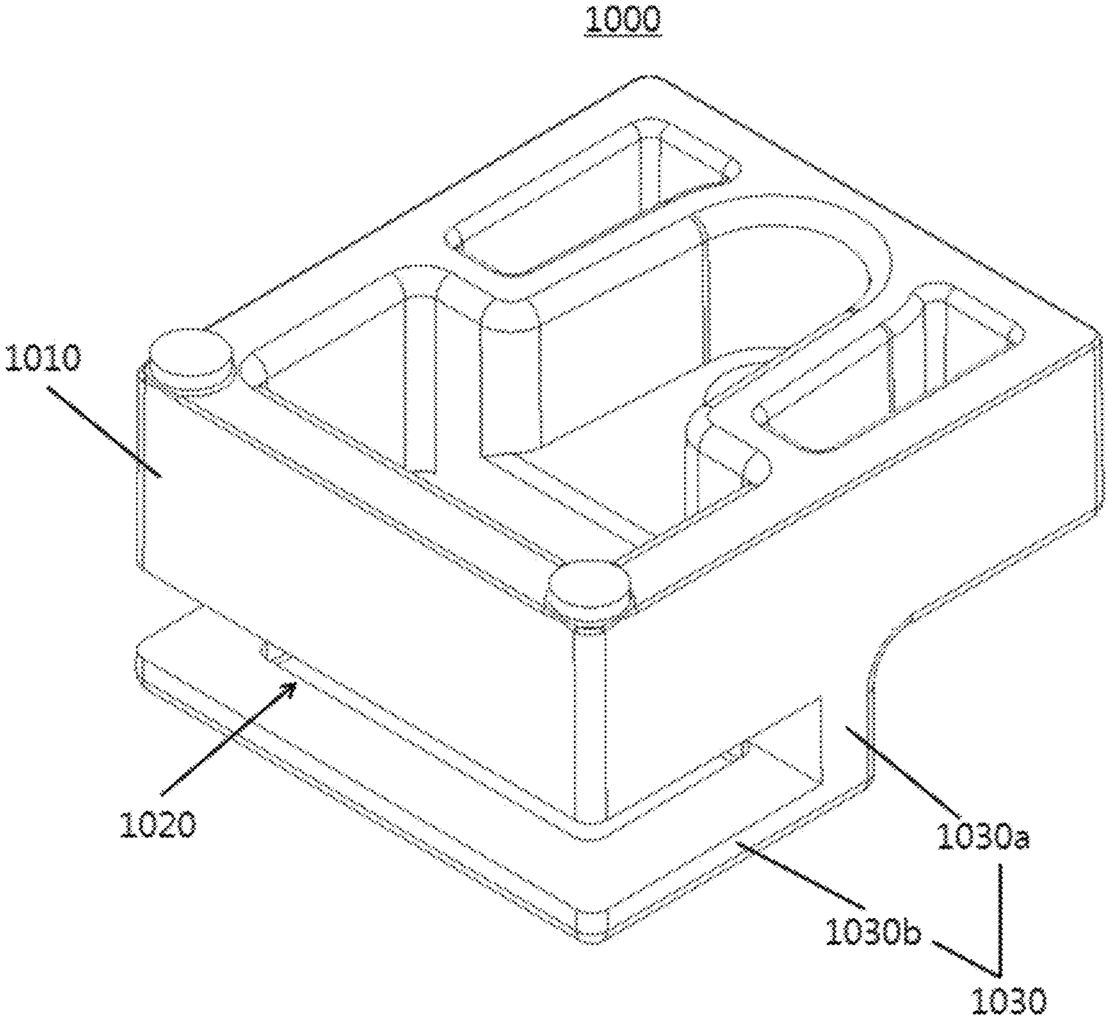
FIG. 11 is a perspective view of a guide member according to another embodiment of the present disclosure as seen from the bottom surface.

FIG. 10 is a perspective view of a guide member according to another embodiment of the present disclosure as seen from the upper surface, and FIG. 11 is a perspective view of a guide member according to another embodiment of the present disclosure as seen from the bottom surface.

Referring to FIGS. 10 and 11, a guide member 1000 according to another embodiment of the present disclosure includes a main body 1010, an opening 1020, and an 'ㄱ'-shaped protrusion 1030.

The main body 1010 is coupled to the reflector and functions to support the 'ㄱ'-shaped protrusion 1030. For example, the main body 1010 may have a rectangular parallelepiped shape, but is not limited thereto.

The sliding bar 145 is inserted into the opening 1020 formed by the 'ㄱ'-shaped protrusion 1030. The 'ㄱ'-shaped protrusion 1030 has an 'ㄱ' shape when the guide member 1000 is viewed from the front, and is divided into a vertical part 1030*a* and a horizontal part 1030*b*. The horizontal part 1030*b* of the 'ㄱ'-shaped protrusion 1030 is positioned at a predetermined distance apart from the main body 1010, and the horizontal part 1030*b* and the main body 1010 are positioned parallel to each other.

The sliding bar 145 is inserted into the space formed between the horizontal part 1030*b* and the main body 1010, and the vertical part 1030*a* functions as a stopper to prevent the inserted sliding bar 145 from coming off. The horizontal part 1030*b* and the main body 1010 prevent the sliding bar 145 from deviating in the vertical direction, and the vertical part 1030*a* guides the sliding bar 145 by preventing it from deviating laterally.

Since the guide member 1000 according to another embodiment of the present disclosure is coupled to the side of the sliding bar 145, it is easier to couple with the sliding bar 145 compared to the guide member described with reference to FIGS. 1 to 9.

The height of the vertical part 1030*a* of the 'ㄱ'-shaped protrusion 1030 is set based on the thickness of the sliding bar 145.

The insertion portion of the guide member 1000 shown in FIGS. 10 and 11 has a structure in which one side is open. Accordingly, the sliding bar 145 may escape from the opening portion.

The phase shifter driving apparatus of the present disclosure is coupled to each sliding bar so that the opening portions of the guide member 1000 face each other to prevent the sliding bar 145 from being separated and to provide appropriate guidance.

Figure 12:
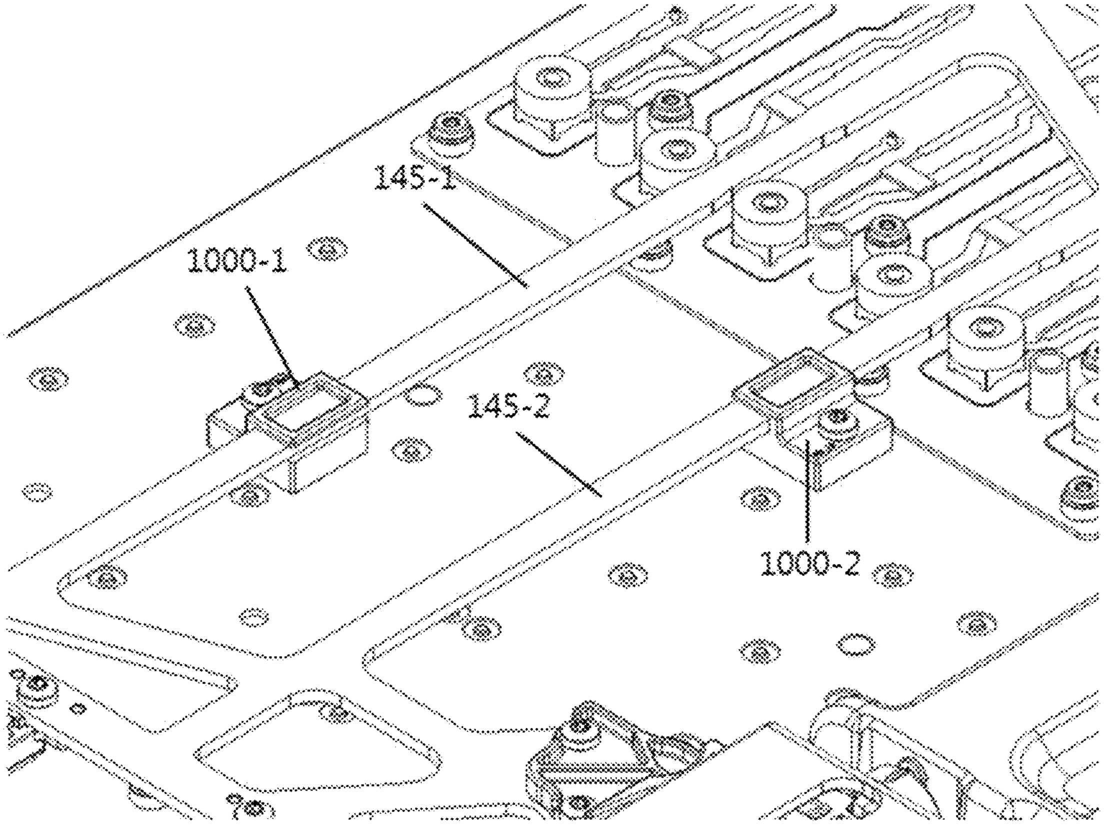
FIG. 12 is a diagram showing a structure in which a guide member is coupled to a plurality of sliding bars in a phase shifter driving apparatus according to another embodiment of the present disclosure.

FIG. 12 is a diagram showing a structure in which a guide member is coupled to a plurality of sliding bars in a phase shifter driving apparatus according to another embodiment of the present disclosure.

As described above, the sliding member 140 includes a plurality of sliding bars 145-1 and 145-2, and guide members 1000-1 and 1000-2 are coupled to each sliding bar 145-1 and 145-2.

A first guide member 1000-1 is coupled to a first sliding bar 145-1, a second guide member 1000-2 is coupled to a second sliding bar 145-2, and the first sliding bar 145-1 and the second sliding bar 145-2 are adjacent to each other.

In this case, the opening portion of the first guide member 100-1 coupled to the first sliding bar 145-1 and the opening portion of the second guide member 100-2 coupled to the second sliding bar 145-2 adjacent to the first sliding bar 145-1 are arranged to face each other.

The first sliding bar 145-1 and the second sliding bar 145-2 are connected to each other as some components of the sliding member 140. Due to the arrangement structure of the guide members as shown in FIG. 12, the second guide member 1000-2 prevents the first sliding member 145-1 from leaving the opening of the first guide member 1000-1.

In FIG. 12, the first sliding bar 145-1 guided by the first guide member 1000-1 may deviate to the right, but since the second guide member 1000-2 prevents the second sliding bar 145-2 from deviating to the right, stable guidance can be achieved. In the same principle, the second sliding bar 145-2 guided by the second guide member 1000-2 may deviate to the left, but since the first guide member 1000-1 prevents the first sliding bar 145-1 from leaving to the left, stable guidance can be achieved.

Figure 13:
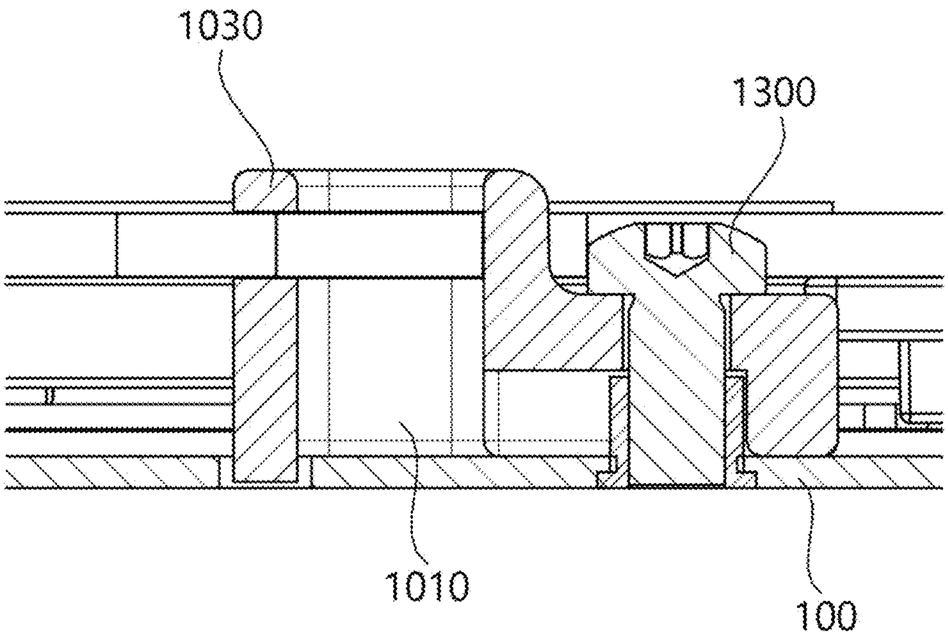
FIG. 13 is a cross-sectional view showing a guide member and a sliding member in a coupled state in a phase shifter driving apparatus according to another embodiment of the present disclosure.

FIG. 13 is a cross-sectional view showing a guide member and a sliding member in a coupled state in a phase shifter driving apparatus according to another embodiment of the present disclosure.

Referring to FIG. 13, the sliding bar 145 is inserted into the insertion space between the 'ㄱ'-shaped protrusions. The main body 1010 is located on the reflector 100, and the main body 1010 may be coupled to the reflector 100 using a bolt 1300.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A phase shifter driving apparatus, comprising:
a sliding member disposed at a predetermined distance from a reflector and including at least one sliding bar that slides in a horizontal direction; and
a guide member fixed to the reflector and guiding a movement of the at least one sliding bar,
wherein the guide member comprises:
a main body,
a first supporter extending in a downward direction from a first side of the main body and contacting the reflector,
a second supporter extending in a downward direction from a second side of the main body and contacting the reflector, and
an insertion portion that protrudes upward from the main body and forms a rectangular shaped insertion hole for inserting the sliding member into a protruding area,
wherein a height of the first supporter and a height of the second supporter are determined based on a distance between the reflector and the at least one sliding bar.

2. The phase shifter driving apparatus according to claim 1,
wherein an open hole is formed in a lower part of the rectangular shaped insertion hole.

3. The phase shifter driving apparatus according to claim 2,
wherein a width of a central portion of the at least one sliding bar is larger than a width of a terminal portion of the at least one sliding bar, and the width of the terminal portion of the at least one sliding bar is set to be smaller than a width of the open hole.

4. The phase shifter driving apparatus according to claim 3,
wherein the terminal portion of the at least one sliding bar is inserted into the rectangular-shaped insertion hole through the open hole of the guide member, the guide member is moved to the central portion of the at least one sliding bar, and then the guide member is fixed to the reflector, and a width of the rectangular shaped insertion hole is based on a width of the at least one sliding bar.

5. The phase shifter driving apparatus according to claim 4,
wherein at least one fixing hook extending in a downward direction is formed on the main body, and the at least one fixing hook is inserted and fixed into an opening of a post coupled to the reflector.

6. The phase shifter driving apparatus according to claim 5,
wherein a locking protrusion is formed in the opening of the post, and the locking protrusion acts as a stopper after the at least one fixing hook is inserted into the opening.

7. The phase shifter driving apparatus according to claim 5,
wherein a locking protrusion is formed in the opening of the post, and the locking protrusion acts as a stopper after the at least one fixing hook is inserted into the opening.

8. A phase shifter driving apparatus, comprising:
a sliding member disposed at a predetermined distance from a reflector and including at least one sliding bar that slides in a horizontal direction; and
a guide member fixed to the reflector and guiding a movement of the at least one sliding bar,
wherein the guide member comprises:
a main body,
a first supporter extending in a downward direction from a first side of the main body and contacting the reflector,
a second supporter extending in a downward direction from a second side of the main body and contacting the reflector, and
an insertion portion that protrudes upward from the main body and forms a rectangular shaped insertion hole for inserting the sliding member into a protruding area,
wherein a width of a central portion of the at least one sliding bar is larger than a width of a terminal portion of the at least one sliding bar.

9. The phase shifter driving apparatus according to claim 8,
wherein an open hole is formed in a lower part of the rectangular shaped insertion hole.

10. The phase shifter driving apparatus according to claim 9,
wherein the width of the terminal portion of the at least one sliding bar is set to be smaller than a width of the open hole.

11. The phase shifter driving apparatus according to claim 10,
wherein the terminal portion of the at least one sliding bar is inserted into the rectangular shaped insertion hole through the open hole of the guide member, the guide member is moved to the central portion of the at least one sliding bar, and then the guide member is fixed to the reflector, and a width of the rectangular shaped insertion hole is set based on a width of the at least one sliding bar.

12. The phase shifter driving apparatus according to claim 11,
wherein at least one fixing hook extending in a downward direction is formed on the main body, and the at least one fixing hook is inserted and fixed into an opening of a post coupled to the reflector.

13. The phase shifter driving apparatus according to claim 8,
wherein a height of the first supporter and a height of the second supporter are determined based on a distance between the reflector and the at least one sliding bar.

14. A phase shifter driving apparatus, comprising:
a sliding member disposed at a predetermined distance from a reflector and including a plurality of sliding bars sliding in a horizontal direction; and
a guide member fixed to the reflector and guiding a movement of the plurality of sliding bars,
wherein the guide member comprises:
a main body coupled to the reflector, and
a L-shaped protrusion protruding from the main body,
wherein the L-shaped protrusion is divided into a horizontal part and a vertical part, and the sliding member is inserted into an insertion space between the horizontal part and the main body.

15. The phase shifter driving apparatus according to claim 14,
wherein the apparatus has a structure in which an opening is formed on one side of the guide member by the L-shaped protrusion.

16. The phase shifter driving apparatus according to claim 15, wherein a first guide member is coupled to a first sliding bar among the plurality of sliding bars, a second guide member is coupled to a second sliding bar adjacent to the first sliding bar, and an opening portion of the first guide member and an opening portion of the second guide member are arranged to face each other.

* * * * *